United States Patent
Connolly et al.

(10) Patent No.: US 10,449,909 B2
(45) Date of Patent: Oct. 22, 2019

(54) BASE ROOF RACK ATTACHMENT SYSTEM FOR GLASS ROOF VEHICLE

(71) Applicant: Tesla, Inc., Palo Alto, CA (US)

(72) Inventors: Paul Connolly, San Francisco, CA (US); Caroline Park, Los Angeles, CA (US); Hubert Kaesweber, Ludwigsburg (DE)

(73) Assignee: Tesla, Inc., Palo Alto, CA (US)

( * ) Notice: Subject to any disclaimer, the term of this patent is extended or adjusted under 35 U.S.C. 154(b) by 50 days.

(21) Appl. No.: 15/690,125

(22) Filed: Aug. 29, 2017

(65) Prior Publication Data
US 2019/0061635 A1    Feb. 28, 2019

(51) Int. Cl.
*B60R 9/052*        (2006.01)
*B60R 9/058*        (2006.01)

(52) U.S. Cl.
CPC .............. *B60R 9/058* (2013.01); *B60R 9/052* (2013.01)

(58) Field of Classification Search
CPC ....................................................... B60R 9/058
USPC ....................................... 224/329, 324, 330
See application file for complete search history.

(56) References Cited

U.S. PATENT DOCUMENTS

| | | | | |
|---|---|---|---|---|
| 3,260,486 A | * | 7/1966 | Groff | ...................... B60R 13/00 224/317 |
| 6,913,310 B2 | * | 7/2005 | Albert | .................... B62D 25/06 296/210 |
| 7,086,693 B1 | * | 8/2006 | Huisman | ................ B62D 25/06 296/146.1 |
| 7,845,704 B2 | * | 12/2010 | Just | ........................... B60J 7/145 296/107.07 |
| 8,256,832 B2 | * | 9/2012 | Adamski | ................ B62D 25/06 296/216.08 |
| 8,672,397 B2 | * | 3/2014 | Stahlhut | ................. B62D 25/06 296/215 |

* cited by examiner

*Primary Examiner* — Nathan J Newhouse
*Assistant Examiner* — Lester L Vanterpool
(74) *Attorney, Agent, or Firm* — Kilpatrick Townsend & Stockton LLP (57) ABSTRACT

A base roof rack system for use in a vehicle having a glass roof. A set of base brackets are installed at the factor proximate to the seam between a glass room and metal support members of the vehicle supporting the roof. A j-shaped hook is able to slide in the seam to access the base bracket. Rotation of the bracket inserts the hook into a cavity formed in the base bracket so that it resist pull out when oriented normal to the roof surface. A tower receives the other end of J-shaped hook, a threaded bolt, and a retaining nut threaded about the bolt compresses the tower down toward the roof.

18 Claims, 8 Drawing Sheets

BASE ROOF RACK ATTACHMENT SYSTEM FOR GLASS ROOF VEHICLE

FIELD OF THE INVENTION

The invention relates in general to attachment systems for vehicle roof racks and more particularly to base roof rack attachment systems for vehicles with glass roofs.

BACKGROUND OF THE INVENTION

Demand for roof racks has steadily increased in the late 1990's and 2000's with the increased interested in activities like kayaking, mountain biking, camping and snowboarding, to name a few. Most of these systems consist of a set of towers or feet that sit directly on the vehicle roof and attach to the bare roof, the rain gutter, or to factory-built mounting points. In vehicles that have factory-mounted roof rails running along left and right edges of the vehicle roof, a set of clamping brackets may be used. For vehicles without any factory-built mounting points or factory-mounted roof rails, universal rack kits exist that attach to the inside of a vehicle's door-jambs. In all these systems, a set of cross bars are attached to these base towers and/or clamping brackets that provide the scaffold upon which to attach activity-specific accessory racks (ski, surfboard, snowboard, bicycle, kayak, etc.) or even cargo carriers.

Companies like Yakima Products Inc. of Lake Oswego, Oreg. and Thule Group of Malmö, Sweden dominate the accessory rack market although other smaller players also make roof rack systems. Yakima and Thule make universal base kits, vehicle specific base kits, and activity specific accessory racks to fit nearly every make of car. Even OEM car manufacturers who sell their own branded base roof rack and activity specific accessory systems often contract with one of these two companies to manufacture their respective roof rack and accessory rack systems.

As a result, base roof racks can be found for nearly every non-convertible passenger vehicle found on the market. Even though racks that attach to a vehicle doorjamb are essentially universal, they are the least integrated from a design perspective and may scratch paint, damage doors seals and affect the fitment of the door into the jamb. Because of this, many automakers choose to offer factory installed roof rails or integrated mounting bases that are concealed in the roof's rain channel behind small removable plastic doors that have been painted to match the body color of the vehicle.

For metal roof vehicles this solution is acceptable because it is relatively easy to stamp metal pieces to remove the material necessary to accommodate these parts. However, recently, glass roof vehicles have been introduced such as the four door Model 3 sedan available from Palo Alto, Calif.-based Tesla, Inc., which includes a two-piece all glass roof spanning from the windshield to the trunk. Vehicles like this have very tight lines and very small gaps (less than 10 mm) between the edge of the roof glass and the metal roof supports running lengthwise along the top of the car. Removing portions of the roof glass to accommodate accessory rack mounting hardware would require cutting glass and therefore would complicate the manufacturing process and may even compromise the strength of the roof and contribute to an unattractive design aesthetic.

Consequently, there exists a need for a roof rack attachment system for use in glass roof vehicles that: 1) doesn't require modifications to the glass geometry; 2) doesn't require the addition of disposable components like plastic doors; 3) can accommodate the relatively small part gaps available in such vehicles; and 4) that contributes to a clean and integrated overall design aesthetic.

SUMMARY OF THE INVENTION

Various embodiments address the needs identified above with a novel and non-obvious base roof rack system for glass roof vehicles. Various embodiments utilize a mounting bracket installed at the vehicle assembly factory underneath the roof glass but accessible via a narrow gap between the roof glass edge and supporting vehicle body structure interconnecting the respective A, B and C pillars of the vehicle.

Various embodiments provide a j-shaped retaining hook that is dimensioned sufficiently thin to fit in the gap between the glass roof and supporting vehicle body structure to enter a recess formed in the mounting bracket. As the j-shaped retaining hook is rotated to be substantially normal to the roof, the j-shaped end is captured within the mounting bracket, under the glass roof and resists pull-out. A tower is placed on the roof, over the threaded end of the j-shaped retaining hook, and a retaining nut is torqued down on the threaded end against a compression plate in the tower, compressing the tower so that it is securely fixed to the roof.

These and other embodiments will become more evident in light of the attached drawing figures and corresponding detailed description.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

The following description is intended to convey a thorough understanding of the embodiments described by providing an attachment systems for vehicle roof racks and more particularly to base roof rack attachment systems for vehicles with glass roofs. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
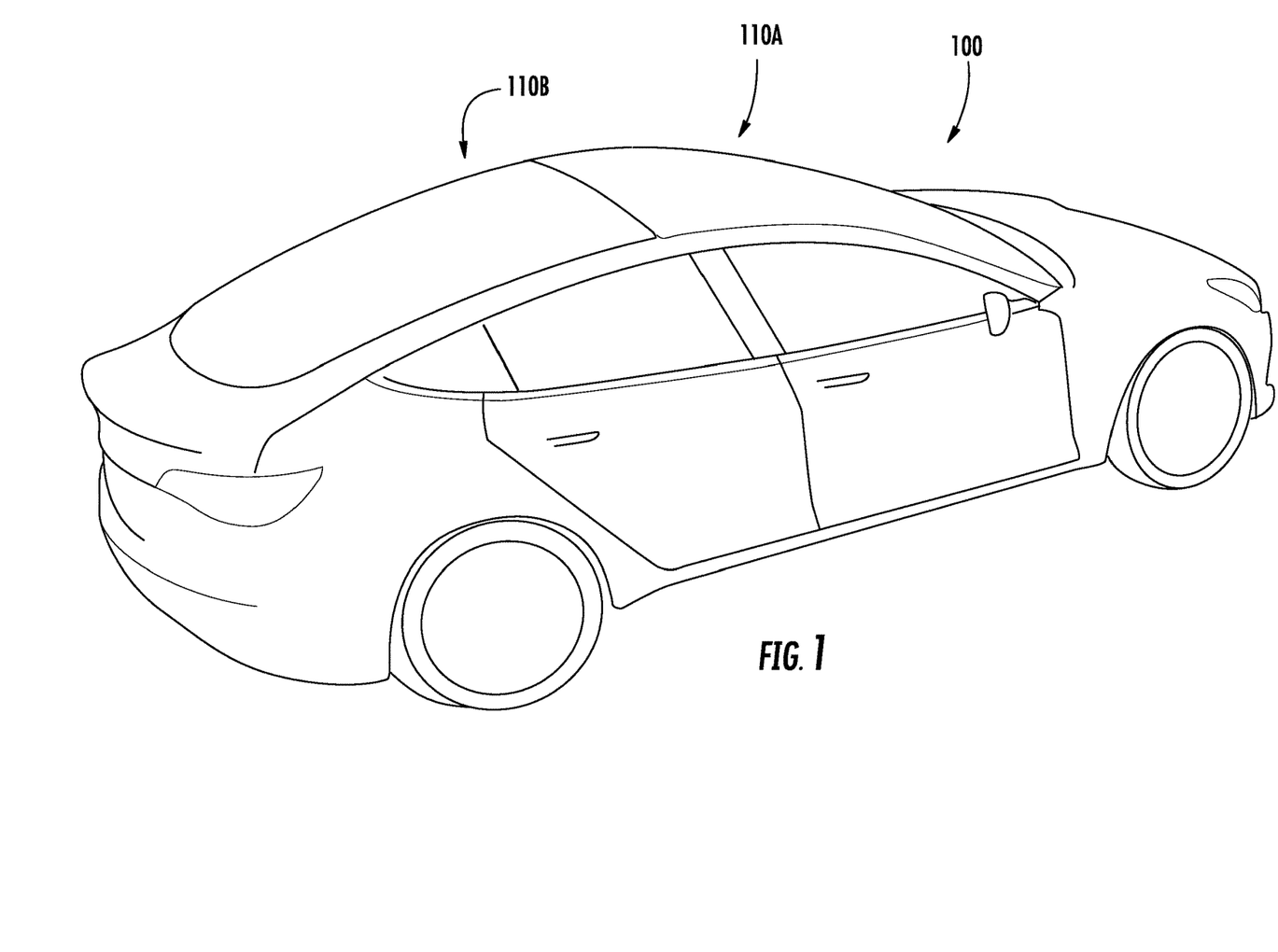
FIG. 1 is a perspective view of an exemplary glass roof vehicle compatible with the various embodiments of the invention.

Referring now to FIG. 1, this figure is a perspective view of an exemplary glass roof vehicle 100 compatible with the various embodiments of the invention. In the example of FIG. 1, the vehicle is a Model 3 from Palo Alto, Calif.-based Tesla, Inc., however it should be appreciated that the various embodiments of the invention are not only useful with this specific vehicle, but rather, may be used with any vehicle having a glass roof. As shown in the figure, the roof is a two-piece glass roof 110A/110B spanning the entire top of the vehicle from the hood to the trunk. As seen, there are no removable access doors, factory-installed rails or other apparent features for receiving a base roof rack. This contributes to a very clean and tight design aesthetic and conceals the fact that the vehicle is pre-configured for attaching to a base roof rack system according to the various embodiments of the invention.

Figure 2:
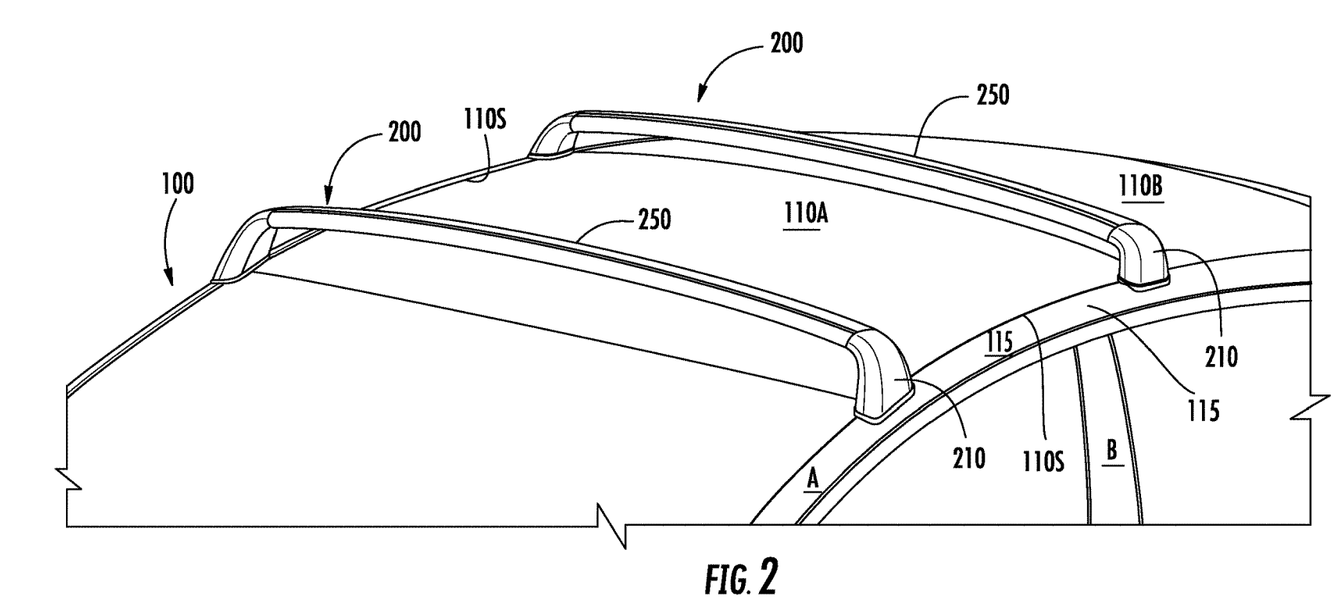
FIG. 2 is a perspective view of a glass roof vehicle with a base roof rack system according to various embodiments of the invention.
Figure 3A:
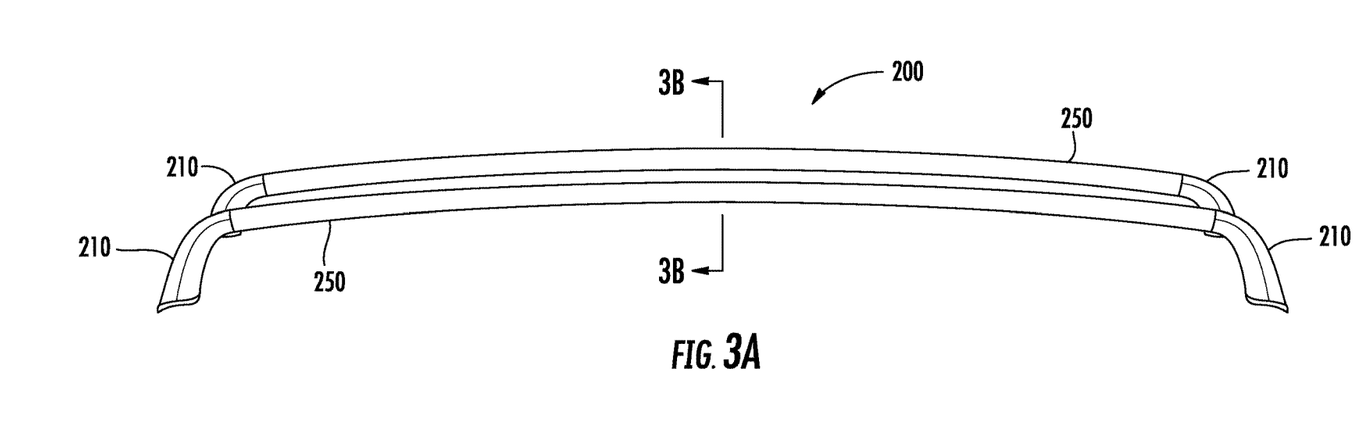
FIG. 3A is a front view of a base roof rack system according to various embodiments of the invention.
Figure 3B:
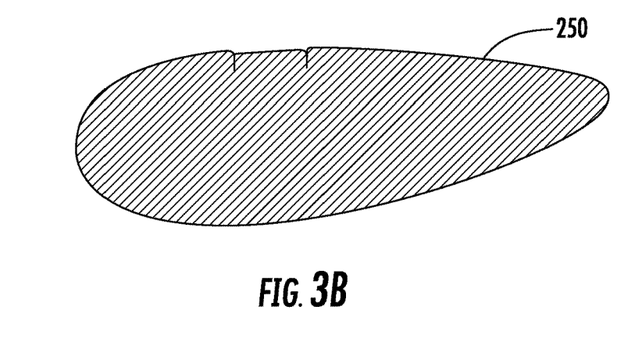
FIG. 3B is a cross sectional view along the line 3B in FIG. 3A.

FIG. 2 is a perspective view of a glass roof vehicle with a base roof rack system according to various embodiments of the invention. This Figure shows a top portion of a glass roof vehicle 100 including roof sections 110A and 110B. Also visible in the figure is seam 110S between glass roof sections 110A/110B and the structural portion 105 interconnecting A, B and C pillars (C not visible in the Figure) of the vehicle. In the case of a glass roofed vehicle, the width of this seam is very small—on the order of 4-9 mm—due in part to the fact that unlike roll formed steel, glass can't be bent into different water shedding shapes at the edge. Like conventional roof racks, the visible components of system 200 include towers 210 and cross bars 250 positioned at symmetric locations on respective left and right sides of vehicle 100. FIG. 3A shows the rack system 200 in isolation and FIG. 3B shows a cross section of cross bar 250, highlighting its aerodynamic design.

Figure 4A:
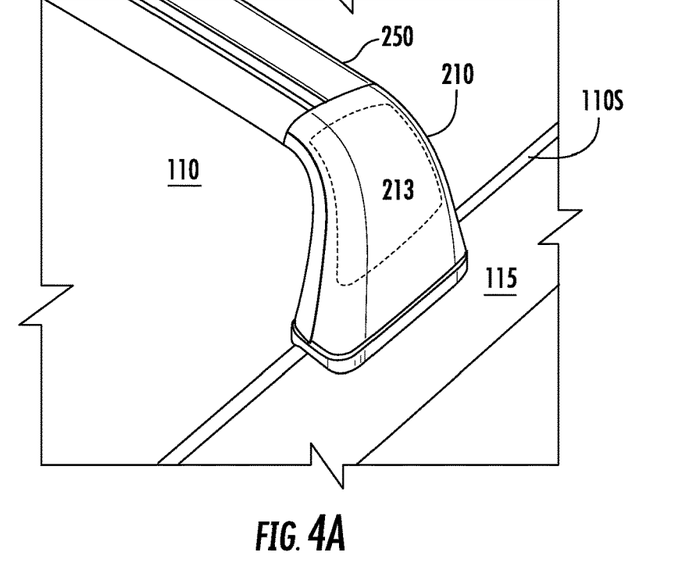
FIGS. 4A and 4B are two isometric view of a tower for a base roof rack system according to various embodiments of the invention.
Figure 4B:
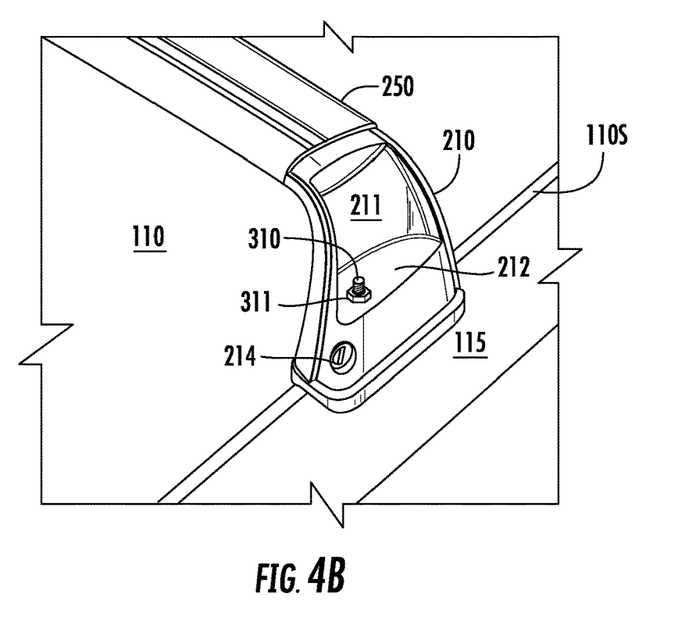

Turning now to FIGS. 4A and 4B, these figures provide detailed views of tower 210 attached over seam 110S between roof 110 and structural portion 115. Door 213 conceals cavity 211 housing internal components of the tower, including threaded shaft 310, retaining nut 311 and compression plate 212. In various embodiments, tower 210 may also comprise lock mechanism 214 which keeps door 213 closed so that rack system 200 cannot be removed by without the key.

Figure 5A:
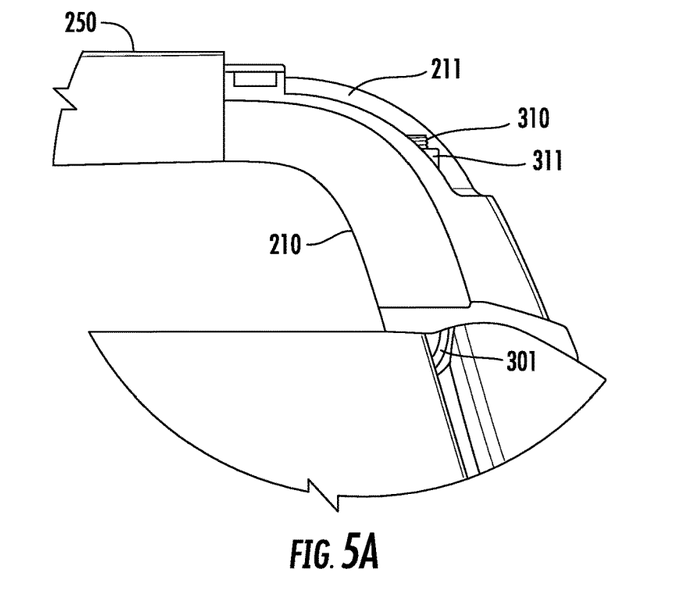
FIG. 5A is a front detail view of a tower for a base roof rack system according to various embodiments of the invention.
Figure 5B:
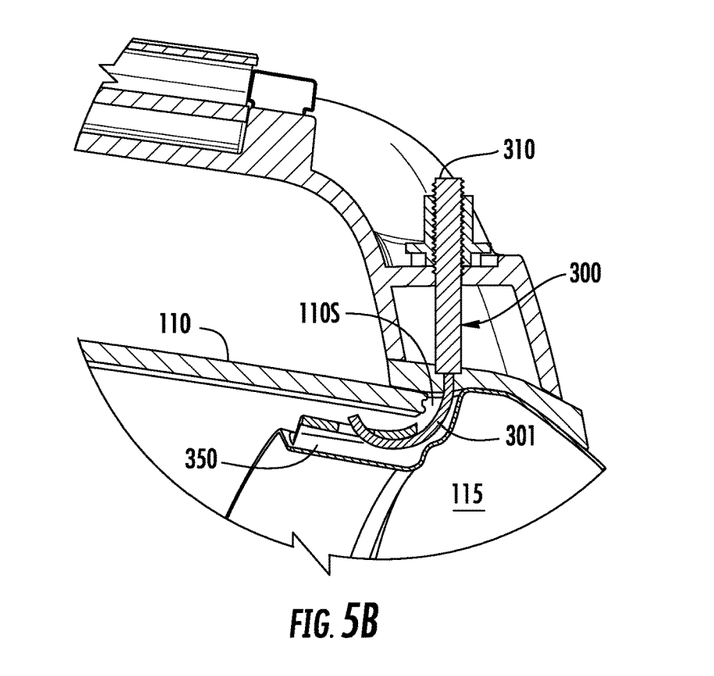
FIG. 5B is a sectional view of the same structure of FIG. 5A.
Figure 6:
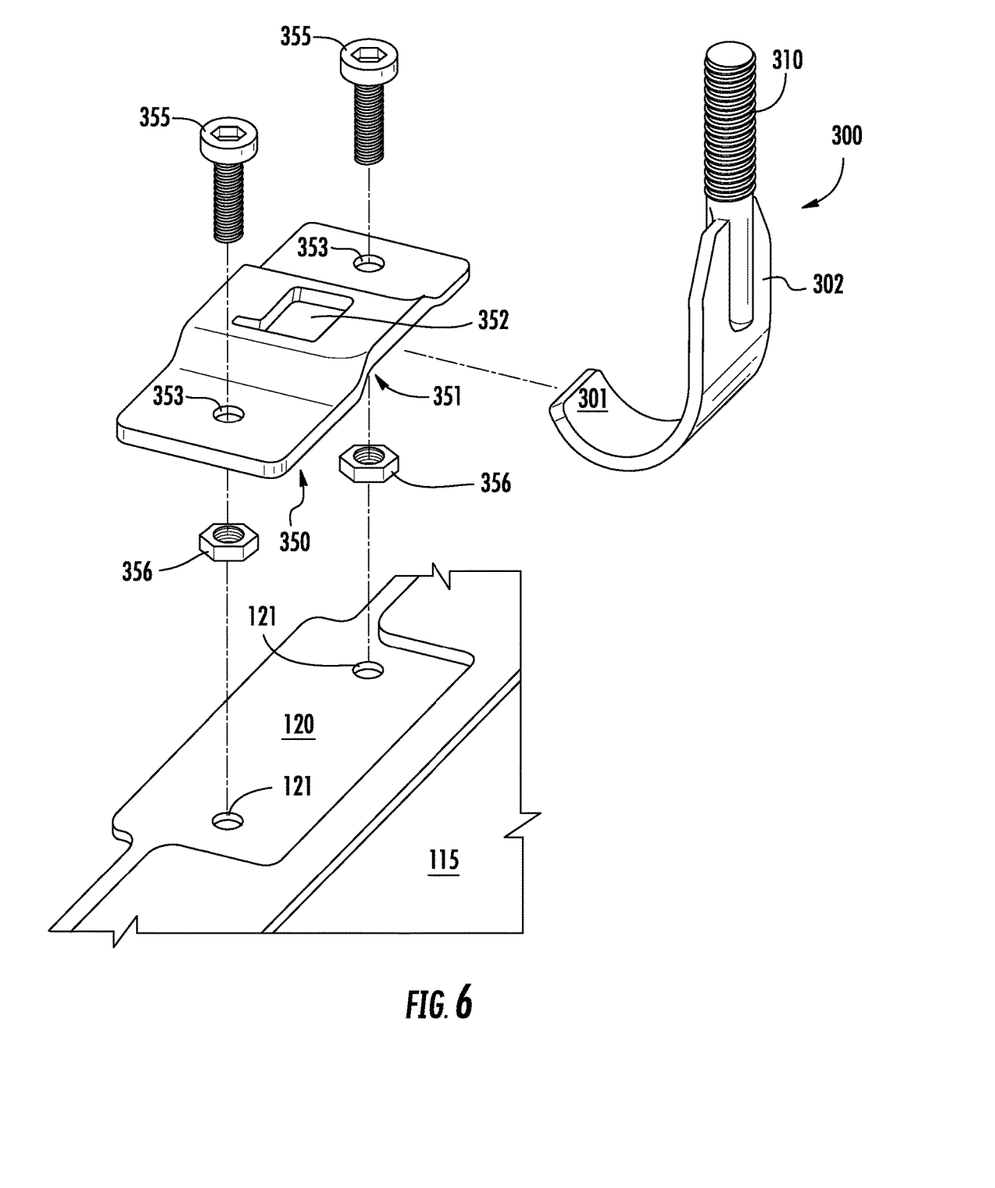
FIG. 6 is an exploded view of a mounting bracket and retaining hook for a base roof rack system according to various embodiment of the invention.
Figures 7A, 7B, 7C:
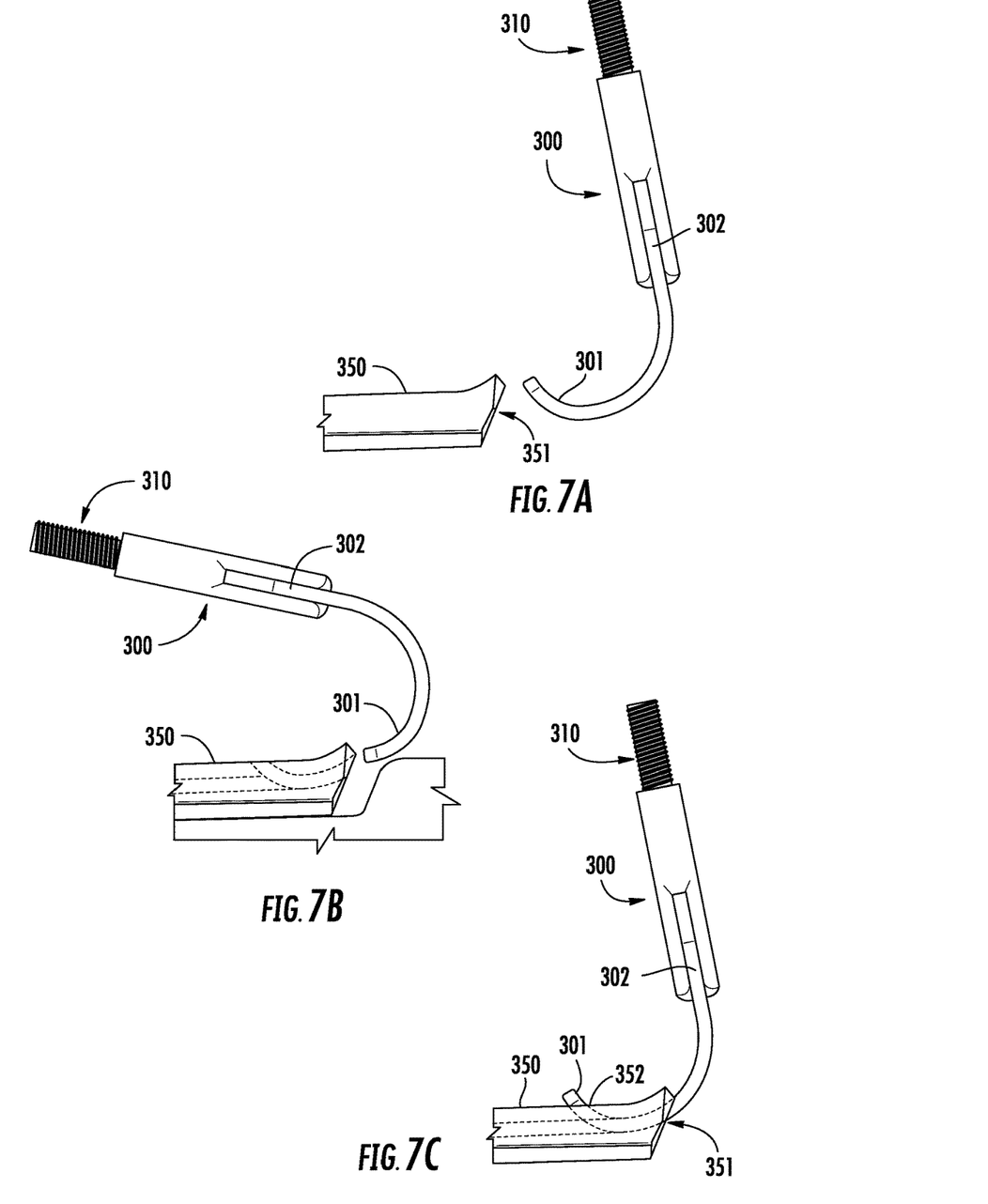
FIGS. 7A-C show steps of the installation process for attaching a retaining hook to the mounting bracket in the base roof rack mounting system according to various embodiments.
Figure 8:
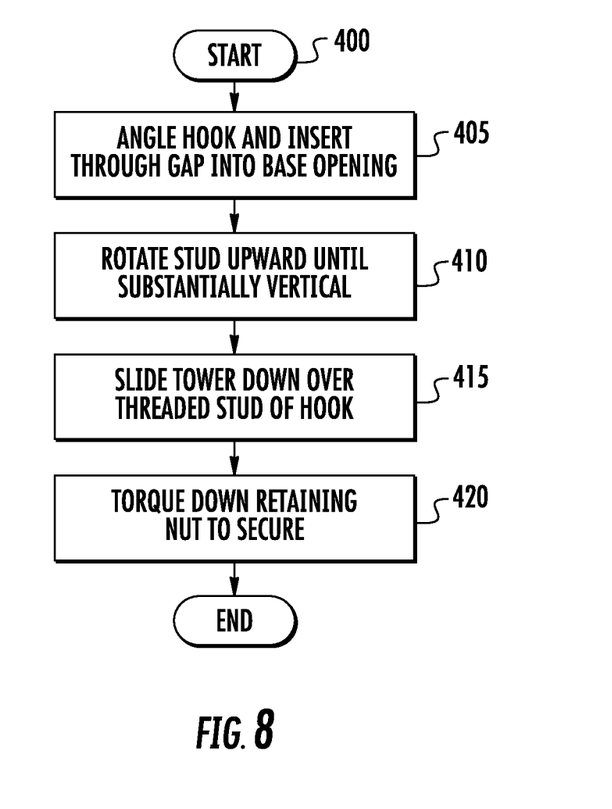
FIG. 8 is a flow chart detailing the steps of a method for installing a base roof rack on a glass roof vehicle according to various embodiments of the invention.

Sectional views shown in FIGS. 5A and 5B, exploded view of FIG. 6, and installation sequence views of FIGS. 7A, 7B and 7C provide even greater detail of internal system components. The foundation of system 200 is a j-shaped retaining hook 300 and base mounting bracket 350. In various embodiments, base mounting bracket 350 is installed in recess 120 formed in structural metal (e.g., aluminum, steel, alloy, etc.) making up the body of vehicle 100. As shown, the recess 120 approximates the footprint of bracket 350 and includes a pair of mounting holes 121 used to permanently attach bracket 350 to the vehicle, such as, for example, with hex bolts 355 and retaining nuts 356. In various embodiments, glass roof 110 will sit above recess 120 and bracket 350 with a small gap in between to prevent stress on the glass. In this way, every vehicle may be pre-equipped to receive a roof rack without adding any visible components or affecting the overall geometry or styling of the vehicle.

FIGS. 5B and 7A-C and illustrate precisely how j-shaped retaining hook 300 is coupled to mounting bracket 350 so that tower 210 can be secured to the vehicle roof. Hook 300 is rotated down toward the roof so that the leading edge of the j-shaped end 301 can be inserted into seam 110S. In various embodiments, a rubber gasket may be present in the seam that can be displaced by pressure from hook portion 301. Once in seam 110S, curved portion 301 can access side opening 351 of bracket 350. As retaining hook 300 is rotated upwards, substantially normal to roof surface 110, curved portion moves under bracket 350 until its leading edge is visible in window 352. Upward pressure on retaining hook 300 will now be transferred to the roof structure via recess 120.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A system comprising:
    a motorized passenger vehicle;
    a glass roof attached to the motorized vehicle and supported on respective left and right side edges by structural metal interconnecting respective left and right A, B and C pillars of the motorized vehicle;
    a plurality of base mounting brackets under the glass roof adjacent a seam between the left and right side edges of glass roof and the structural metal and accessible from above the glass roof via the seam; and
    a curved restraining hook comprising a hook end and a threaded member, wherein the curved restraining hook is configured to be restrained by the base bracket against pullout in a normal direction by placing the hook end into the seam with the curved restraining hook at a first angle relative to the glass roof and rotating the curved restraining hook from the first angle to a second angle relative to the glass roof so that the hook end is received in a cavity formed in one of the plurality of base mounting brackets and so that the threaded member projects above the glass.

2. The system according to claim 1, further comprising a tower that sits on the glass roof, wherein the tower receives the threaded member in a recess formed therein.

3. The system according to claim 2, wherein the recess terminates in a compression plate concealed behind a removable door formed in the tower.

4. The system according to claim 3, further comprising a retaining nut attached to the threaded member that compresses the tower against the roof when torqued against the compression plate.

5. The system according to claim 1, wherein the seam has a width in a range between 4 mm and 9 mm.

6. The system according to claim 1, wherein the hook end has a width that is more than 4× its thickness.

7. An attachment mechanism for a vehicle accessory rack comprising:
- a base bracket positioned under a glass vehicle roof adjacent a seam between an edge of the glass roof and a structural portion of a vehicle supporting the glass roof, the base bracket comprising a cavity beginning at the seam and terminating in a window under the glass roof; and
- a retaining hook, the retaining hook comprising a j-shaped member at a first end, and a threaded stud at an opposing second end, wherein the j-shaped member is dimensioned to enter the cavity opening at the seam at a first orientation and to travel through the cavity to the window as the retaining hook is rotated to a second orientation, wherein in the second orientation, the threaded stud is normal to the glass roof and the j-shaped member is restrained by the base bracket against pull-out in the normal direction.

8. The mechanism according to claim 7, further comprising a tower portion, the tower portion comprising a recess dimensioned to accept the threaded stud and terminating a in a compression plate, the compression plate concealed behind a detachable door formed in the tower.

9. The mechanism according to claim 8, further comprising a retaining nut engaged with the threaded stud, the retaining nut compressing the tower to the vehicle roof when the retaining nut torqued against the compression plate.

10. The mechanism according to claim 7, wherein the structural portion of the vehicle comprises structural metal interconnecting A, B and C pillars of the vehicle.

11. The mechanism according to claim 7, wherein the seam has a width in a range between 4 mm and 9 mm.

12. The mechanism according to claim 7, wherein the j-shaped member has a width that is more than 4× its thickness.

13. In a vehicle having a non-metal roof, wherein the non-metal roof is supported by respective left and right structural portions of the vehicle interconnecting A, B and C pillars of the vehicle on respective left and right sides of the vehicle, and having four base mounting brackets positioned at discrete mounting points under the non-metal roof adjacent respective left and right seams between the vehicle roof and the left and right structural portions of the vehicle so that there are two base mounting brackets on each side of the vehicle, each base mounting bracket comprising an attachment portion for attachment to the structural portions, and a cavity that opens into the seam and terminates in a window visible under the non-metal roof, a base roof rack system comprising:
- four retaining hooks, each retaining hook comprising a j-shaped member at a first end and a threaded stud at a second end;
- four support towers, each support tower comprising a first recess formed therein, the first recess starting in a bottom surface thereof and terminating in a mounting plate inside the tower behind a door formed in the tower; and
- four retaining nuts, each retaining nut dimensioned to rotate about one of the threaded studs and to compress the tower towards the roof when torqued against the mounting plate.

14. The system of claim 13, further comprising a detachable door formed in the tower for providing access to the retaining nut and mounting plane.

15. The system of claim 14, further comprising a lock portion for locking the door to the tower.

16. The system according to claim 13, wherein the seam has a width in a range between 4mm and 9 mm.

17. The system according to claim 13, wherein the j-shaped member has a width that is more than 4× its thickness.

18. The system according to claim 13, further comprising a pair of cross bars, an end of each cross bar adapted to fit in a second recess formed in each tower to create a scaffold on which to attach additional activity specific mounting accessories.

* * * * *